US012159554B1

(12) United States Patent
Hu

(10) Patent No.: US 12,159,554 B1
(45) Date of Patent: Dec. 3, 2024

(54) SCENE SIMULATION DEVICE

(71) Applicant: Shouhong Hu, Hunan Province (CN)

(72) Inventor: Shouhong Hu, Hunan Province (CN)

( * ) Notice: Subject to any disclaimer, the term of this patent is extended or adjusted under 35 U.S.C. 154(b) by 0 days.

(21) Appl. No.: 18/432,320

(22) Filed: Feb. 5, 2024

Related U.S. Application Data

(63) Continuation of application No. 18/452,039, filed on Aug. 18, 2023, now Pat. No. 12,033,537.

(51) Int. Cl.
*G09F 19/02* (2006.01)

(52) U.S. Cl.
CPC .................................... *G09F 19/02* (2013.01)

(58) Field of Classification Search
CPC . A63J 5/026; A63J 5/028; G09F 19/10; G09F 19/02; G09F 19/12
See application file for complete search history.

(56) References Cited

U.S. PATENT DOCUMENTS 2,543,606 A * 2/1951 Solomon ................. A63J 5/028 472/75
3,366,787 A * 1/1968 Kelley .................... F21S 8/088 362/311.06
5,200,239 A * 4/1993 Chen ...................... A47G 33/06 40/410
6,269,566 B1 * 8/2001 Lo .......................... G09F 19/08 40/406
11,996,011 B1 * 5/2024 Yu .......................... G09F 19/08
2002/0106249 A1 * 8/2002 Lin ......................... G09F 19/02 406/106
2005/0120602 A1 * 6/2005 Skinner ................... G09F 19/10 40/410
2009/0086494 A1 * 4/2009 Kenney ..................... F21V 1/00 362/356
2022/0184519 A1 * 6/2022 Chen ....................... A63J 5/028

* cited by examiner

*Primary Examiner* — Cassandra Davis

(57) ABSTRACT

The present disclosure provides a scene simulation device. The scene simulation device including a shell having a scene space, and floating flocs, a transport pipeline, and a fan which are arranged in the shell. The shell includes a middle frame, and a top shell and a base which are respectively connected to an upper end and a lower end of the middle frame. A bottom opening of the transport pipeline is communicated to the scene space and is located at a bottom of the scene space. A position of a top opening of the transport pipeline is equal to or greater than ⅔ of a height of the middle frame. A distance between the top opening of the transport pipeline and a dispersing component is equal to or less than ⅓ of a distance between the dispersing component and a bottom surface of the scene space.

19 Claims, 12 Drawing Sheets

SCENE SIMULATION DEVICE

CROSS-REFERENCE TO RELATED APPLICATIONS

The application is a Continuation-in-Part of the U.S. application Ser. No. 18/452,039, filed on Aug. 18, 2023, which is incorporated herein by reference in its entireties.

TECHNICAL FIELD

The present disclosure relates to the technical field of decorations, and in particular, to a snow scene simulation device.

BACKGROUND

At present, a snowing effect inside an existing snowing crystal ball needs to be achieved after a user shakes the crystal ball with a hand. This method is cumbersome, and the snowing effect disappears when white flowing debris inside the crystal ball falls, so that the snowing scene is unsustainable.

To solve this problem, in an existing snow scene simulation device, an air blower may be mounted at a bottom of the device. The air blower is used in conjunction with a pipeline to blow white floating flocs from the bottom to the top of the simulation device. The white floating floc will fall from top to bottom. After being received by a filter net of the simulation device close to the top, the while floating flocs will fall to achieve a scene for simulating snowing. However, in this way, the white floating flocs can easily block mesh holes on the filter net, which affects the snowing effect. When the air blower cooperates with the pipeline to blow the white floating flocs from the bottom to the top of the simulation device, the white floating flocs always fall to positions within a certain range of the filter net. Therefore, the falling range of the white floating flocs through the filter net is small, and the white floating flocs are not dispersed enough, which affects the effect of the snowing scene.

SUMMARY

The present disclosure mainly aims to provide a snow scene simulation device to solve the problem that an effect of a snowing scene is affected by a small falling range of white floating flocs achieved by use of an air blower in an existing snowing scene simulation device in conjunction with a filter net.

The present disclosure has the following beneficial effects. Compared with the prior art, in this embodiment, through the dispersing component, after the floating flocs are sprayed out from the top of the transport pipeline under the driving of the fan, the floating flocs are dispersed by the dispersing component, so as to expand a falling range of the floating flocs. This solves the problem of a small falling range of the white floating flocs achieved by use of an air blower in an existing snowing scene simulation device in conjunction with a filter net, and better creates a snowing effect or effects of other atmosphere scenes. Furthermore, by limiting the distance between the top opening of the transport pipeline and the dispersing component, the floating flocs can be effectively sprayed out of the top opening of the transport pipeline and then flap the dispersing component for dispersion, which enlarges a range of dispersion of the floating flocs.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
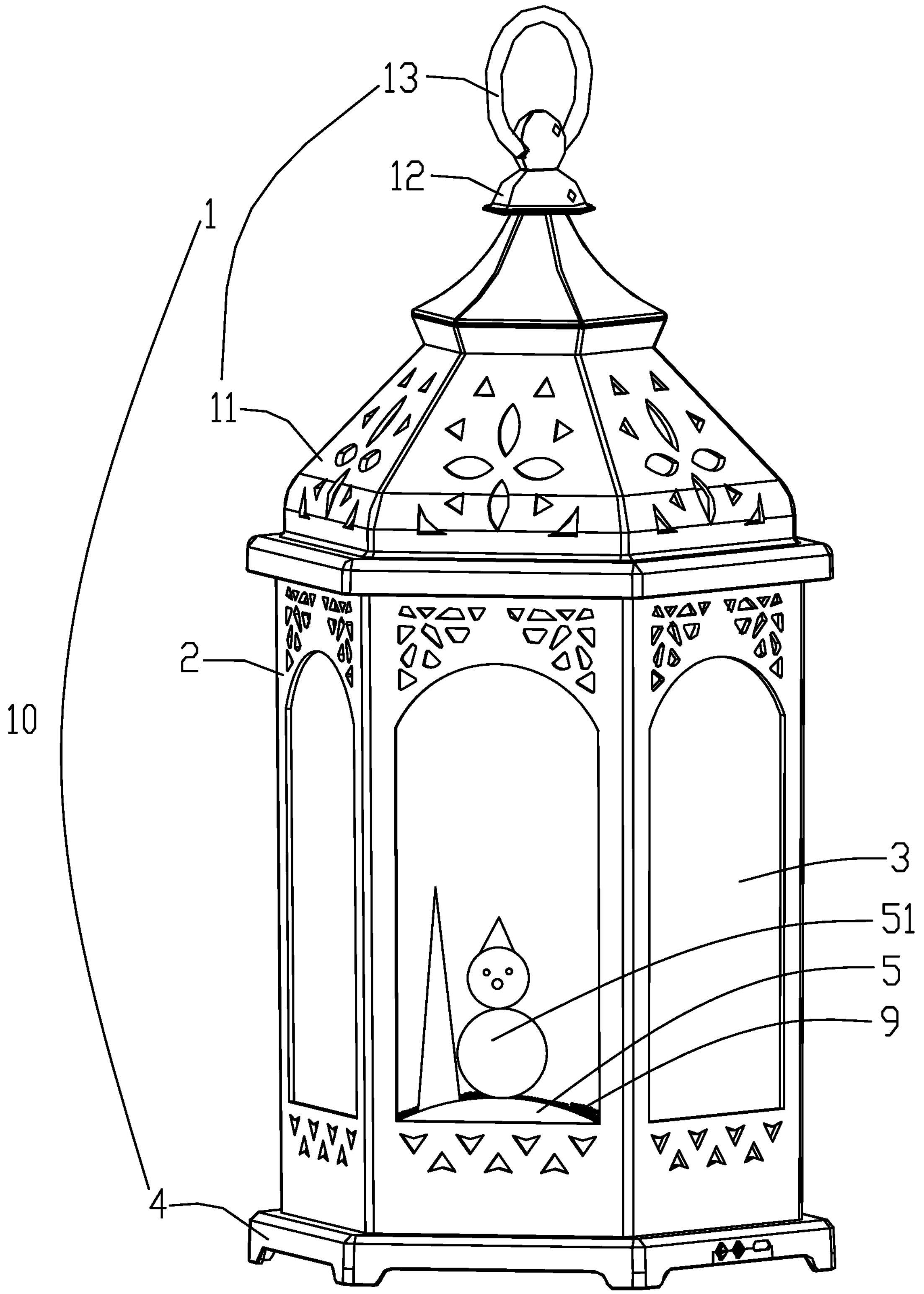
FIG. 1 is a three-dimensional diagram according to the present disclosure.
Figure 2:
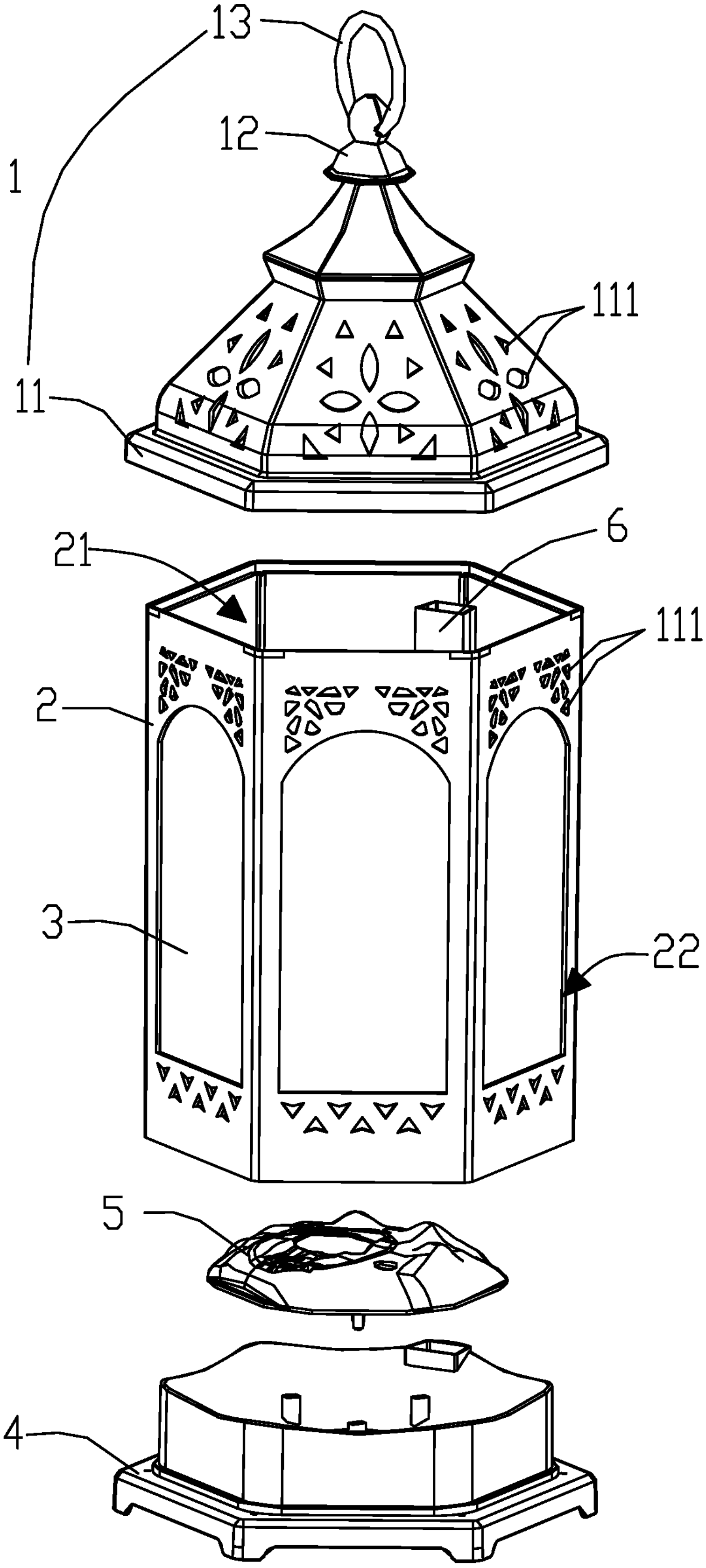
FIG. 2 is a partially exploded diagram of the present disclosure.
Figure 3:
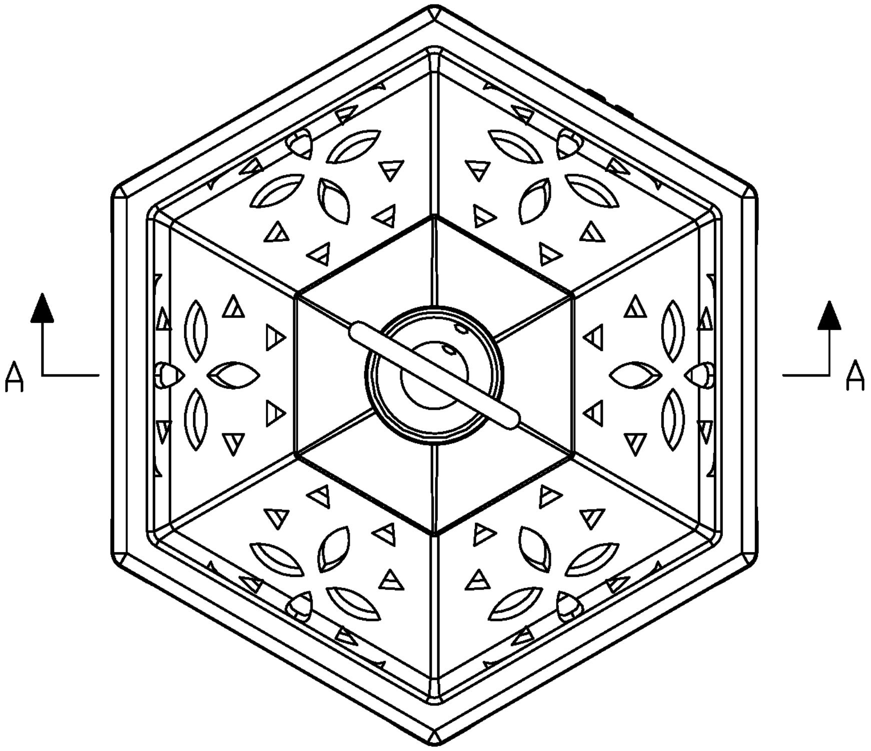
FIG. 3 is a top view of the present disclosure.

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 12, a scene simulation device in the embodiments of the present disclosure is provided. The scene simulation device includes: a shell 10 having a scene space 21, and floating flocs 9, a transport pipeline, and a fan 8 which are arranged in the shell 10, wherein the shell 10 includes a middle frame 2, and a top shell 1 and a base 4 which are respectively connected to an upper end and a lower end of the middle frame 2; the scene space 21 is formed by enclosing the middle frame 2, the top shell 1, and the base 4; a bottom opening of the transport pipeline is communicated to the scene space 21 and is located at a bottom of the scene space 21; a position of a top opening of the transport pipeline is equal to or greater than ⅔ of a height of the middle frame 2, or a distance between the top opening of the transport pipeline and a dispersing component 141 is equal to or less than ⅓ of a distance between the dispersing component 141 and a bottom surface of the scene space 21; the floating flocs 9 are configured to enter the transport pipeline along the bottom of the scene space 21 and are sprayed out from a top of the transport pipeline along the transport pipeline when the fan 8 is turned on; and a dispersing component 141 configured to disperse the floating flocs 9 sprayed out from the transport pipeline is arranged in the scene space 21.

In this embodiment, through the dispersing component 141, after the floating flocs 9 are sprayed out from the top of the transport pipeline under the driving of the fan 8, the floating flocs 9 are dispersed by the dispersing component 141, so as to expand a falling range of the floating flocs 9. This solves the problem of a small falling range of the white floating flocs 9 achieved by use of an air blower 8 in an existing snowing scene simulation device in conjunction with a filter net, and better creates a snowing effect or effects of other atmosphere scenes Furthermore, by limiting the distance between the top opening of the transport pipeline and the dispersing component 141, the floating flocs 9 can be effectively sprayed out of the top opening of the transport pipeline and then flap the dispersing component 141 for dispersion, which enlarges a range of dispersion of the floating flocs 9.

Specifically, the dispersing component 141 is located right above the top opening of the transport pipeline; at least a portion of an outer surface of the dispersing component 141 is a surface such as a spherical surface, a quasi spherical surface, an arc-shaped surface, a quasi arc-shaped surface, or an inclined surface that can disperse the floating flocs 9 sprayed out from the transport pipeline. The quasi spherical surface and the quasi arc-shaped surface can be each composed of at least one arc-shaped surface and/or at least one plane, or formed by combining at least one arc-shaped surface and at least one plane. Therefore, after the floating flocs 9 are sprayed out from the top of the transport pipeline under the driving of the fan 8, the floating flocs will flap the dispersing component 141. As the surface of the dispersing component 141 is spherical, quasi spherical, arc-shaped, quasi arc-shaped, or inclined, the floating flocs 9 flapping different positions on the dispersing component 141 will be reflected at different angles and then fall. This allows the floating flocs 9 to be dispersed at any position on a horizontal plane of the scene space 21, so as to expand the falling range of the floating flocs 9.

In an embodiment, a material of the transport pipeline is plastic, which is convenient for production and reduces the manufacturing cost.

In an embodiment, referring to FIG. 2 to FIG. 5, a plurality of display windows 22 are formed in a side wall of the middle frame 2, and a first transparent plate 3 is arranged at the display windows 22. The first transparent plate 3 can be used to show a scene inside the scene simulation device of this embodiment. A first gap 24 communicated to the scene space is formed between the first transparent plate and an inner side wall of the middle frame. Through the first gap 24 and the display windows 22, the scene space 21 can be communicated to an external environment, which enhances air circulation in the scene space 21 and better creates a snowing effect or effects of other atmosphere scenes.

Specifically, the plurality of display windows 22 are distributed on the middle frame 2 in a surrounding manner; the first transparent plate 3 can be fixed on the inner side wall of the middle frame by pasting and forms the first gap 24. The first transparent plate 3 may be a glass plate, a plastic plate, a transparent film, and the like.

Figure 6:
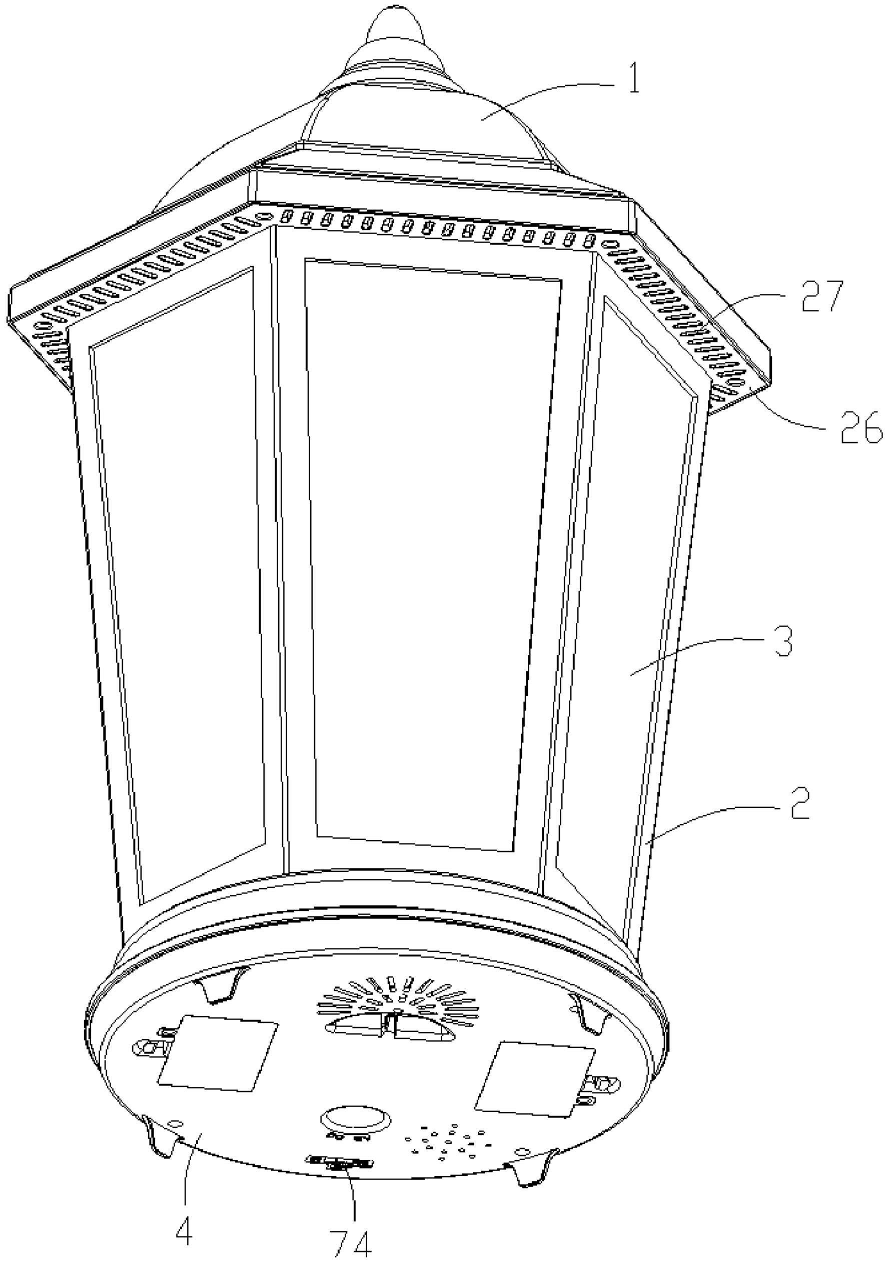
FIG. 6 is a three-dimensional diagram of another embodiment of the present disclosure.
Figure 7:
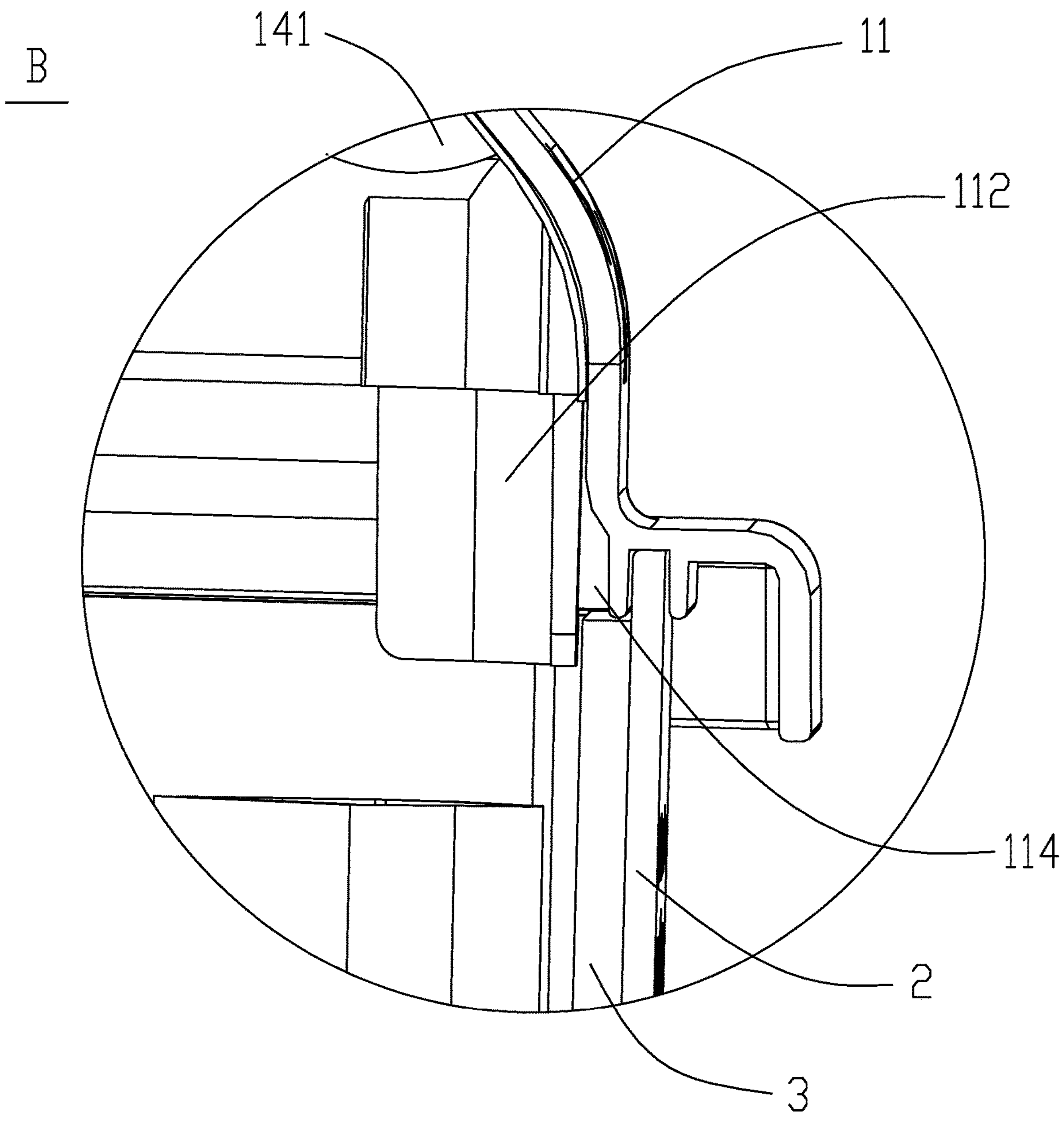
FIG. 7 is a structural diagram of a middle frame according to another embodiment of the present disclosure.

In an embodiment, referring to FIG. 6 to FIG. 7, a top of the middle frame 2 extends outwards to form an outer rim 26; and an air inlet hole 27 communicated to the scene space 21 is formed in the outer rim 26. The outer rim 26 is connected to the top shell 1 by a screw, a buckle, or the like, which can also enhance air circulation in the scene space 21. Furthermore, the outer rim 26 is arranged in the top shell 1, which can enhance the air circulation in the scene space 21 to achieve a waterproof effect.

In an embodiment, the transport pipeline is located between two adjacent display windows 22, so as to hide the transport pipeline; it is not easy for the user to find; and the influence of the transport pipeline on the simulation of the scene inside the scene simulation device.

In an embodiment, the top shell 1 includes an outer cover 11 and a second transparent plate 14 arranged on an inner side of the outer cover 11; a plurality of decorative holes 111 are formed in a position, corresponding to the second transparent plate 14, on the outer cover 11; and a second gap 25 communicated to the scene space 21 is formed between the second transparent plate 14 and an inner side wall of the outer cover 11. Through the second gap 25 and the decorative holes 111, the scene space 21 can be communicated to the external environment, so as to further enhance the air circulation inside the scene space 21. Furthermore, through the light decorative holes 111, the aesthetics of the scene simulation device of this embodiment can be improved.

Figure 11:
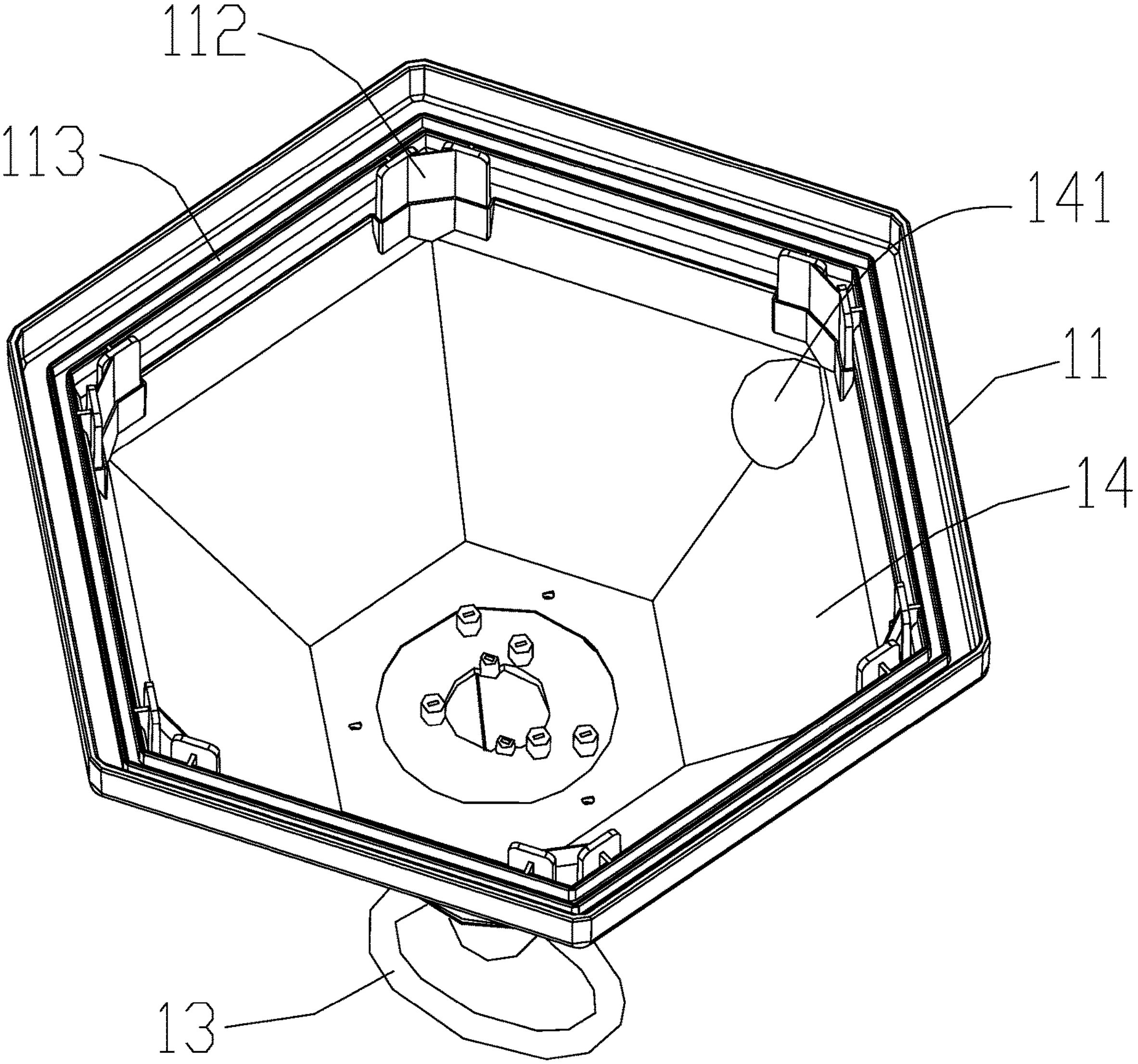
FIG. 11 is a schematic diagram of a top shell of the present disclosure.

In the above embodiment, referring to FIG. 11, the dispersing component 141 is integrally formed with the second transparent plate 14 or the outer cover 11, so as to reduce the manufacturing steps of the scene simulation device in this embodiment and improve the production effect. Of course, in other embodiments, the dispersing component 141 can also be fixed to the shell 10 by pasting or welding, and the connection way between the dispersing component 141 and the shell 10 is not limited here.

Figure 4:
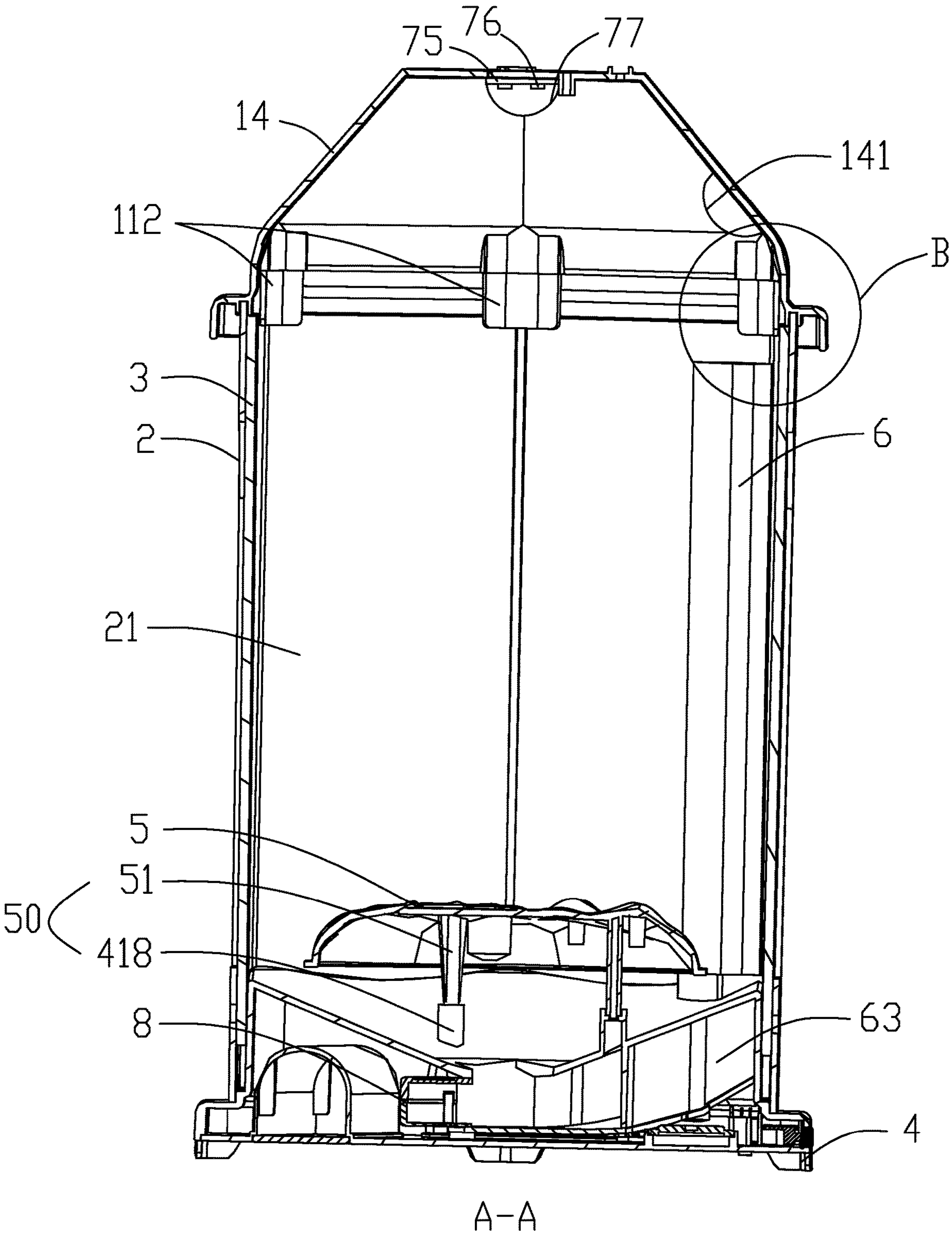
FIG. 4 is a partially cross-sectional view of FIG. 3 along direction A-A.
Figure 5:
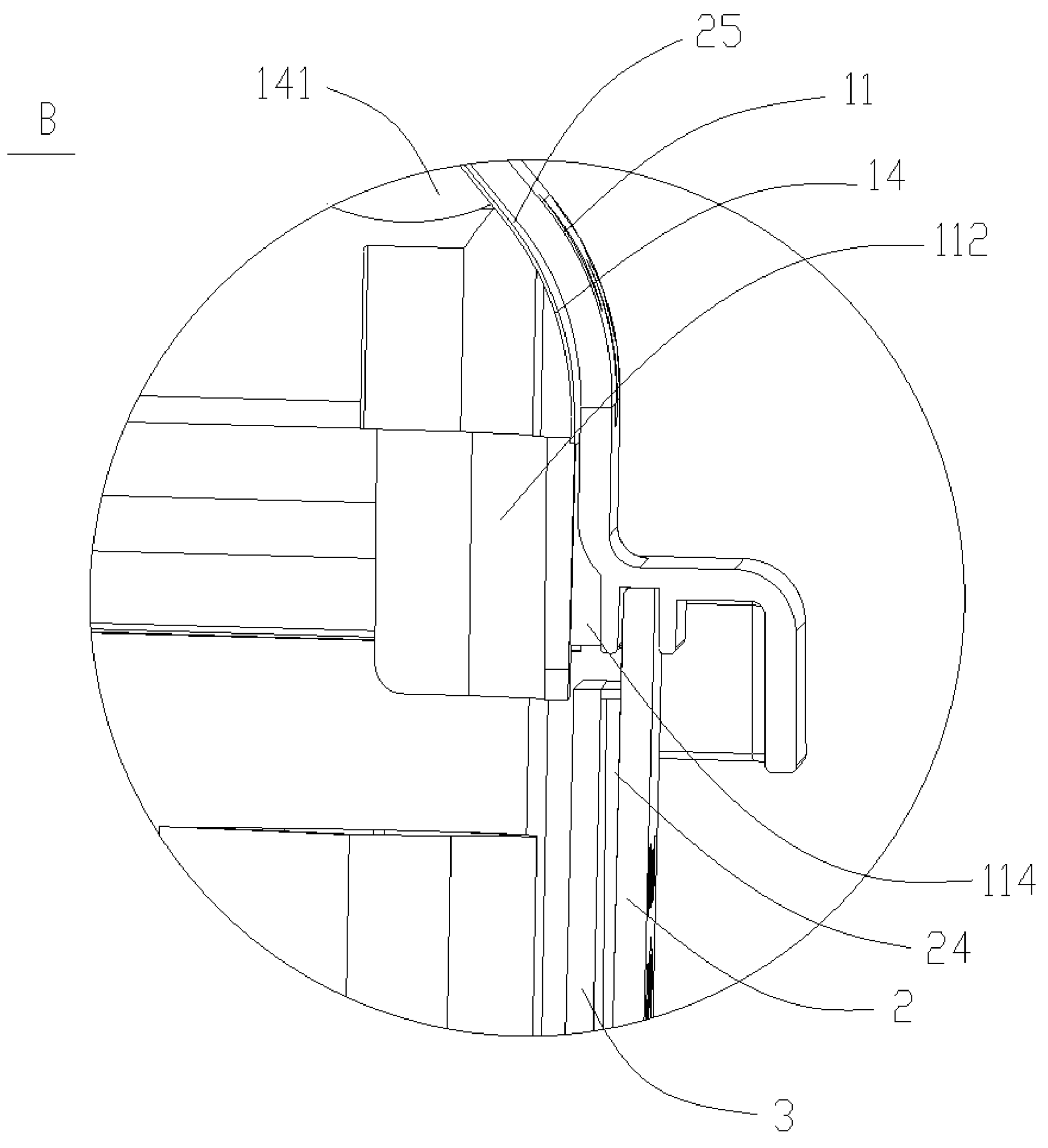
FIG. 5 is an enlarged view of region B in FIG. 4.

In an embodiment, referring to FIG. 4, an atmosphere lamp 76 is arranged on the top shell 1. Through the atmosphere lamp 76, by cooperation with the outer cover 11 and the decorative holes 111 on the middle frame 2, the scene simulation device can better create an ambience. To create a warm atmosphere, the atmosphere lamp 76 can emit warm yellow light. To create a festive atmosphere, the atmosphere lamp 76 can emit colorful light, and the like. When the atmosphere lamp 76 is turned on, a user can enjoy the light at night or in low light.

In an embodiment, referring to FIG. 1, a supporting seat 5 and scene decorations 52 arranged on the supporting seat 5 are arranged in the scene space 21. The scene space 21 can be created through the supporting seat 5 and the scene decorations 52, such as a snowing space and a dreamlike space.

An upper surface of the supporting seat 5 can be white, green, pink, and the like, or the upper surface of the supporting seat 5 can be provided with a lawn or covered with pink particles. The scene decorations 52 can be Christmas trees, snowmen, gift boxes, pets, houses, and the like, and the scene decorations 52 can be fixed to the supporting seat 5 by pasting or insertion. The floating flocs 9 can be white particles, pink particles, feathers, flakes, and the like. Manufacturers can configure the floating flocs 9 according to a desired scene effect. There are no restrictions on the supporting seat 5, the scene decorations 52, and the floating flocs 9 here.

Continuing to refer to FIG. 4, a bottom surface of the supporting seat 5 is spaced apart from a bottom surface of the scene space 21, and a circumferential side of the supporting seat 5 is spaced apart from a side wall of the scene space 21. A width of a cross section of the supporting seat 5 gradually decreases from bottom to top, so that the floating flocs 9 can slide from a surface of the supporting seat 5 to a bottom of the scene space 21 after falling onto the supporting seat 5.

In an embodiment, the bottom surface of the scene space 21 is connected to the supporting seat 5 through a plurality of supporting columns 50 spaced apart from each other. The supporting columns 50 are used to separate the supporting seat 5 from the bottom surface of the scene space 21, so that the floating flocs 9 are located at the bottom of the scene space 21. Of course, in other embodiments, the bottom of the supporting seat 5 may also be provided with a bottom avoidance port configured to guide the floating flocs 9 to the scene space 21.

Specifically, in the above embodiment, the supporting columns 50 are arranged on the bottom surface of the scene space 21 and are connected to the supporting seat 5 through screws. Or, the supporting columns 50 are arranged at the bottom of the supporting seat 5 and are connected to the bottom surface of the scene space 21 through screws. Or, the supporting columns 50 include a first column body 51 arranged on the supporting seat 5 and a second column body 418 arranged on the bottom surface of the scene space 21. The first column body 51 and the second column body 418 are connected to each other by insertion or by screws, which can also separate the supporting seat 5 from the bottom surface of the scene space 21.

Figure 9:
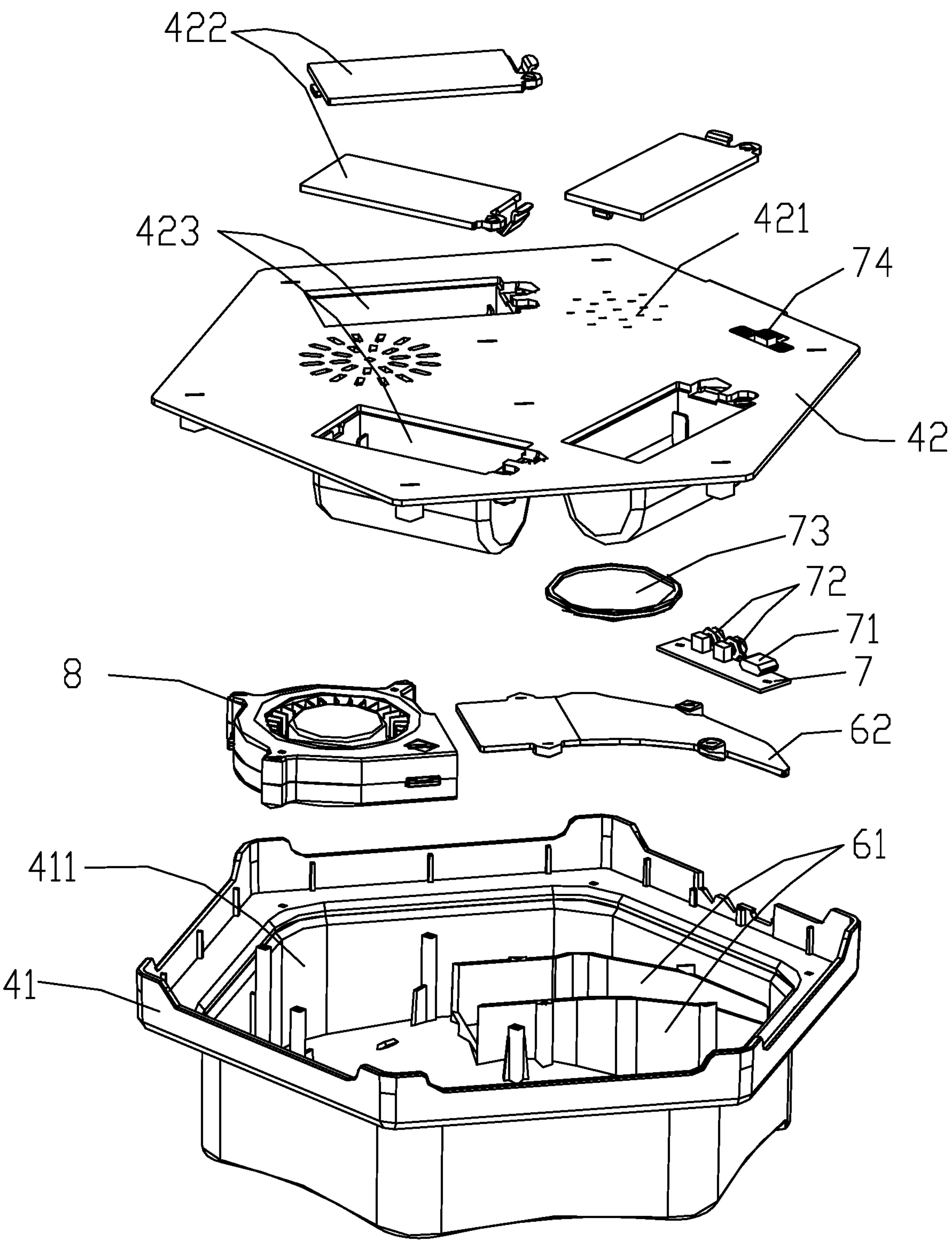
FIG. 9 is an exploded diagram of a base of the present disclosure.
Figure 10:
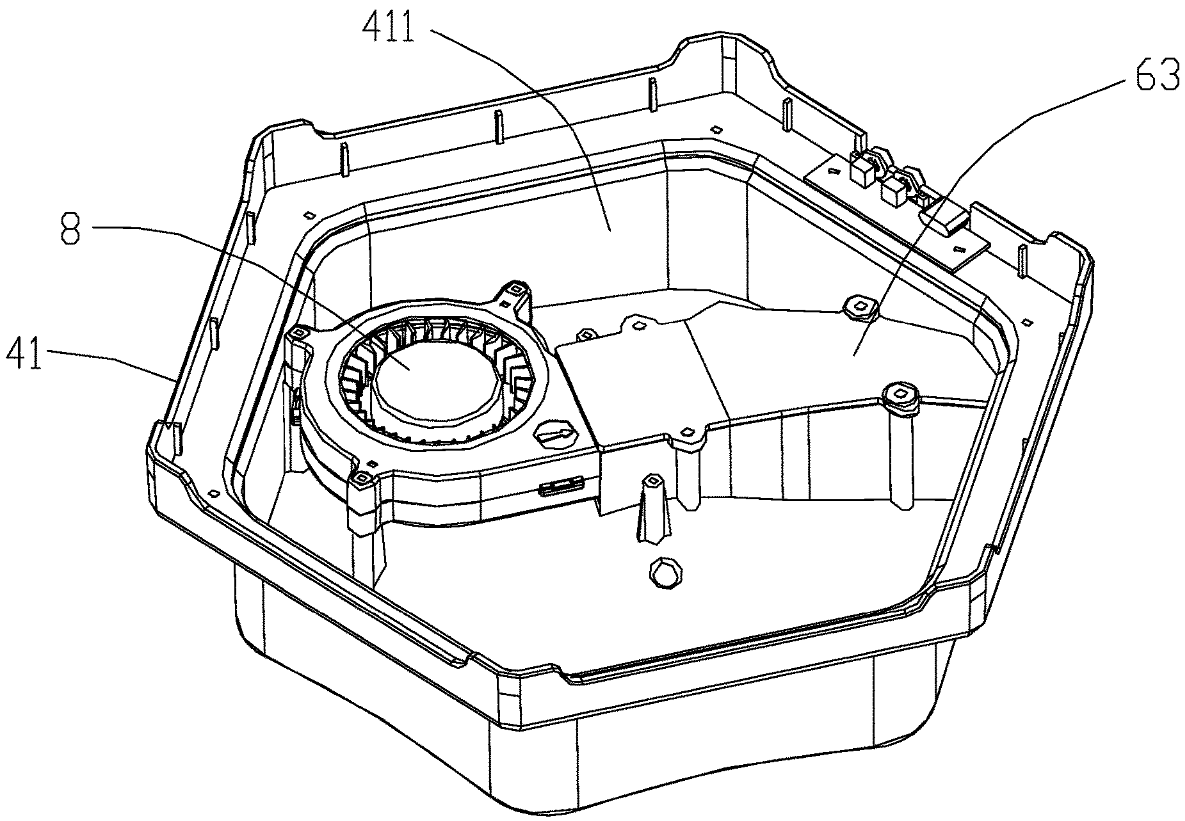
FIG. 10 is a schematic diagram of mounting a fan and a bottom pipeline in a mounting cavity according to the present invention.

In an embodiment, referring to FIG. 4 and FIG. 9 to FIG. 10, the transport pipeline includes a bottom pipeline 63 communicated to the scene space 21 and a vertical pipeline 6 that is connected to the bottom pipeline 63 and arranged on a side wall of the middle frame 2; one end of the bottom pipeline 63 away from the vertical pipeline 6 is connected to an air outlet of the fan 8. In this way, after the floating flocs 9 fall into the bottom pipeline 63, when driven by the fan 8, the floating flocs 9 can be blown to be moved along the bottom pipeline 63 and the vertical pipeline 6, and sprayed out from the top of the vertical pipeline 6.

In an embodiment, referring to FIG. 4, a width of a cross section of the supporting seat 5 gradually decreases from bottom to top; a circumferential side of the supporting seat 5 is spaced apart from the side wall of the scene space 21; a width of a cross section of a bottom surface of the scene space 5 gradually decreases from top to bottom, so that it is convenient for the floating flocs 9 to slide to the bottom of the scene space 21. Specifically, the bottom surface of the scene space 21 may be an arc-shaped surface, an inclined surface, or the like.

Specifically, referring to FIG. 9, the base 4 includes a surface shell 41 and a bottom plate 42 connected to the surface shell 41 to form a mounting cavity 411; and the fan 8 and the bottom pipeline 63 are both located in the mounting cavity 411. An upper surface of the surface shell 41 is the bottom surface of the scene space 21. The surface shell 41 is provided with a first through hole 417 communicated to the bottom pipeline 63 and a second through hole 415 communicated to the bottom pipeline 63 and the vertical pipeline 6 respectively; and the fan 8 is located on one side of the first through hole 417 away from the vertical pipeline 6. In this way, the floating flocs 9 can enter the bottom pipeline 63 from the first through hole 417. When the fan 8 is turned on, the floating flocs 9 is blown to be moved along the bottom pipeline 63 and the vertical pipeline 6, and sprayed out from the top of the vertical pipeline 6.

In an embodiment, referring to FIG. 9 to FIG. 10, the bottom pipeline 63 includes: two pipeline side walls 61 molded with the surface shell 41 in an integrated molding manner and a panel 62 connected to the pipeline side walls 61. The surface shell 41 protrudes upwards along a circumferential side of the second through hole 415 to form an insertion surrounding wall 416; and a bottom of the vertical pipeline 6 is arranged inside the insertion surrounding wall 416. The insertion surrounding wall 416 is used to facilitate the mounting of the vertical pipeline 6 and achieve a communication connection with the bottom pipeline 63, so as to simulate the production and manufacturing of the scene simulation device of this embodiment.

Figure 8:
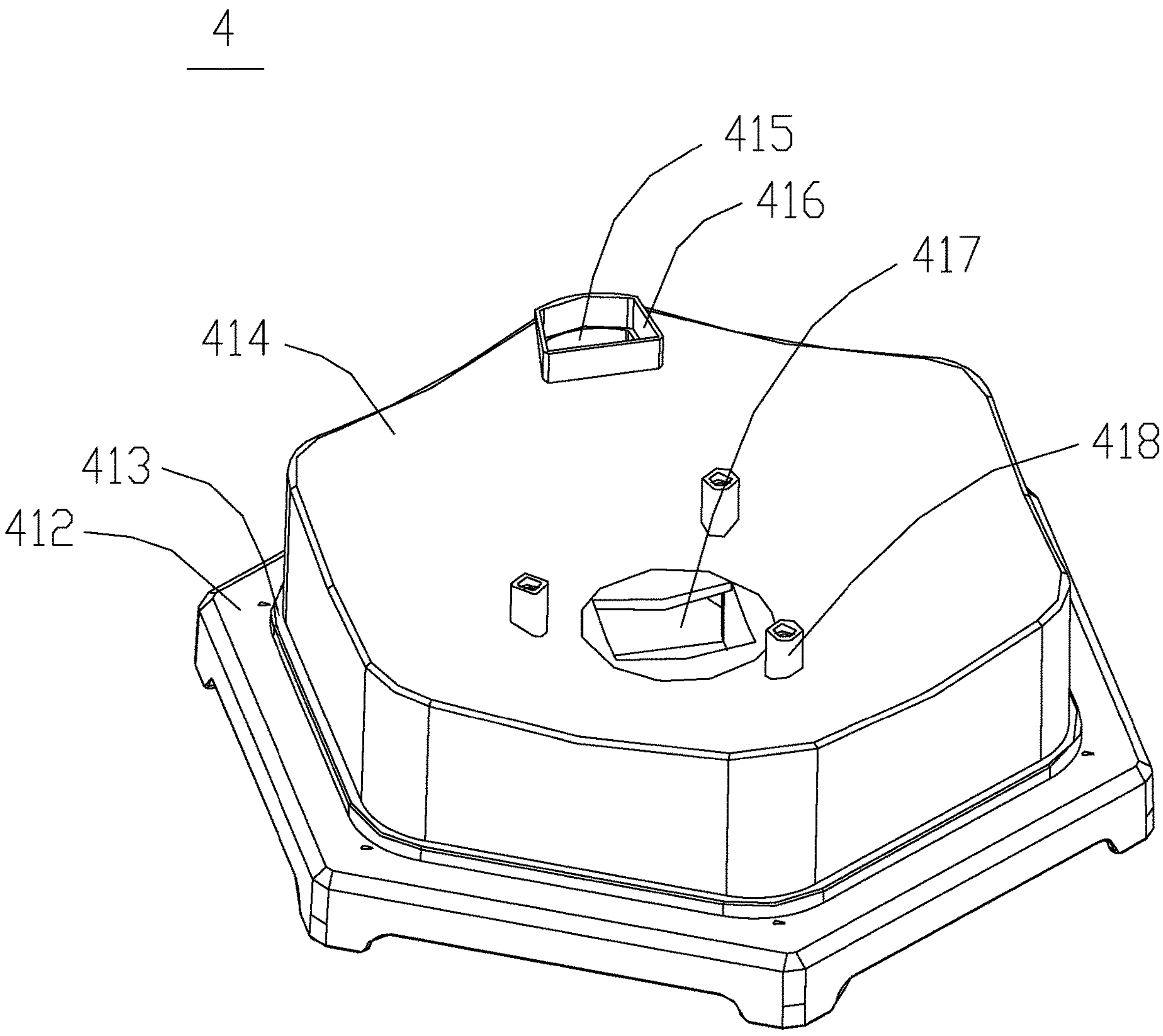
FIG. 8 is a schematic diagram of a base of the present disclosure.

In an embodiment, referring to FIG. 4 and FIG. 8, the surface shell 41 includes a boss 414, a first step 413 connected to a bottom of the boss 414, and a second step 412 connected to a bottom of the first step 413. A bottom of the middle frame 2 sleeves an outer side of the first step 413 and is connected to the second step 412, so as to connect the middle frame 2 to the base 4. The first transparent plate 3 is located between an inner side wall of the middle frame 2 and an outer side wall of the boss 414.

Specifically, the middle frame 2 is a hexagonal prism, and the shape of the outer side wall of the boss 414 is consistent with the shape of the middle frame 2. In this shape, there are six display windows 22 corresponding to six side walls of the hexagonal prism. The middle frame 2 is locked and fixed with the second step 412 at a position between two side walls by screws. In other embodiments, the middle frame may also be in another shape such as a pentagonal prism and a cylinder, and the shape of the middle frame 2 is not limited here.

In one embodiment, referring to FIG. 11, a bottom surface of the outer cover 11 is provided with a first insertion slot 113 configured to insert the middle frame 2. A top of the middle frame 2 is arranged in the first insertion slot 113 to improve the structural compactness of the scene simulation device of this embodiment. Specifically, the top of the middle frame 2 can be connected to the outer cover 11 through glue, buckles, or screws. The outer cover 11 is provided with a plurality of limiting plates 112 on an inner side of the first insertion slot 113; the limiting plates 112 are located on the inner side of the middle frame 2 and are spaced apart from the inner side wall of the middle frame 2 to form a second insertion slot 114; and the first transparent plate 3 is located in the second insertion slot 114. The second insertion slot 114 is used to limit the first transparent plate 3, so as to facilitate the mounting of the first transparent plate 3. Furthermore, upper and lower ends of the first transparent plate 3 are limited from the bottom and the top by cooperation with the first step 413, which improves the stability of mounting of the first transparent plate 3.

Specifically, referring to FIG. 4, a lampshade 77 and a lamp panel 75 are arranged on an inner top of the outer cover 11. The lamp panel 75 is located inside the lampshade 77, and the atmosphere lamp 76 is a light-emitting diode (LED) lamp arranged on the lamp panel 75 to facilitate the mounting of the atmosphere lamp 76. Specifically, the LED lamp can be a single-color lamp, a three-color lamp, and the like. The lamp panel 75 is fixed to the outer cover 11 by a screw, and the lampshade 77 can be fixed to the outer cover 11 by a screw or pasting. In other embodiments, the lampshade 77 is a hemispherical lampshade 77. Furthermore, in order to improve the atmosphere rendering effect, an outer surface of the hemispherical lampshade 77 is composed of a plurality of planes.

Figure 12:
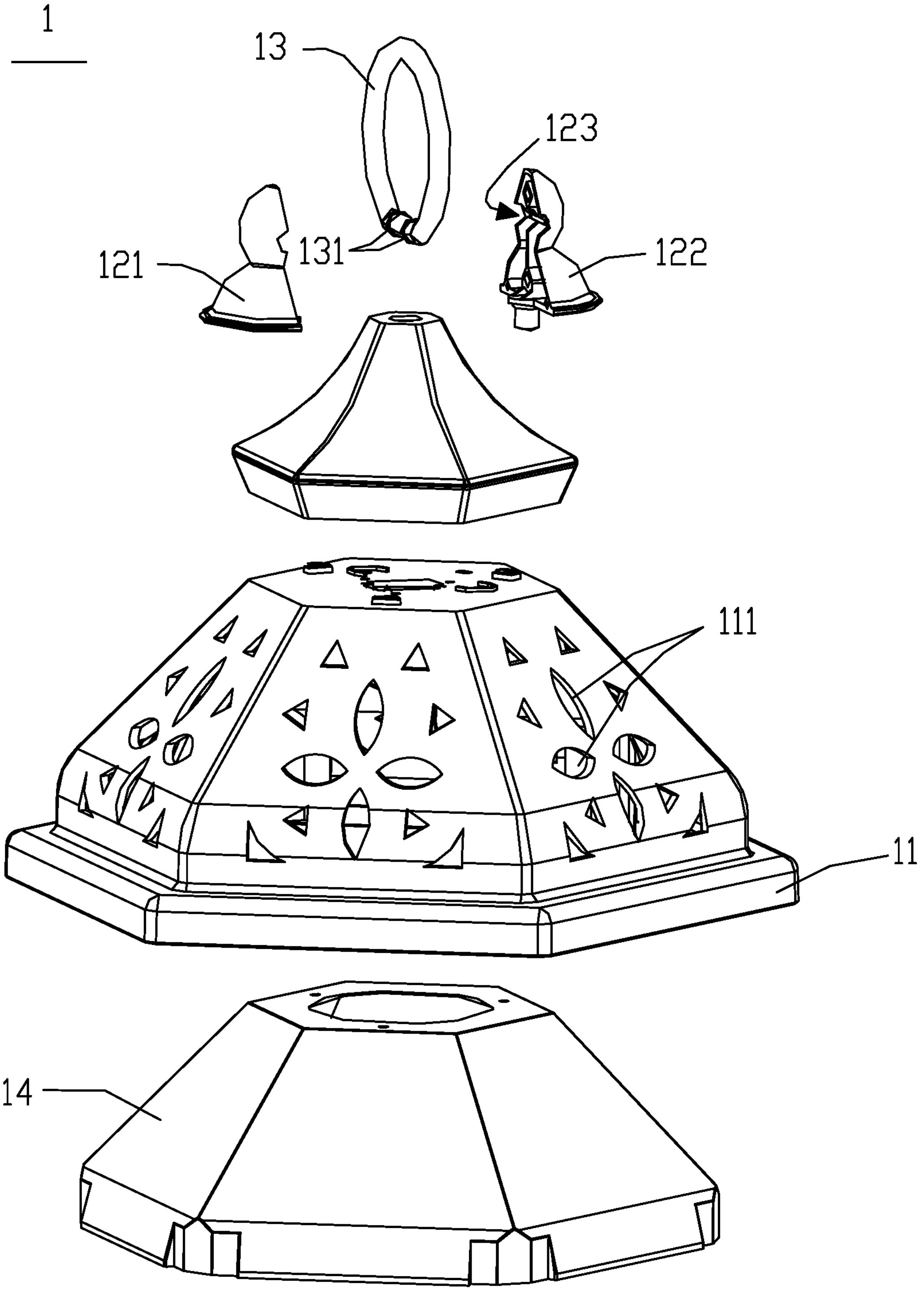
FIG. 12 is an exploded diagram of a top shell of the present disclosure.

In an embodiment, referring to FIG. 12, a handle portion 13 is arranged at a top of the top shell 1. Through the handle portion 13, it is convenient for the user to fetch the scene simulation device of this embodiment or hang the scene simulation device of this embodiment in the air.

Specifically, the top shell 1 further includes a top connecting body 12; the top connecting body 12 includes a left shell 121 arranged at a top of the outer cover 11 and a right shell 122 connected to the left shell 121 and forming an accommodating cavity 123 that penetrates through the top connecting body 12. Specifically, the left shell 121 can be connected to the outer cover 11 by a screw, and the right shell 122 and the left shell 121 can be connected to each other by a screw, a buckle, or the like. Two ends, close to the accommodating cavity 123, of the handle portion 13 placed in the accommodating cavity 123 are respectively raised to form limiting convex blocks 131. The handle portion 13 is limited by the limiting convex blocks 131 to prevent the handle portion 13 from moving in a lengthwise direction of the accommodating cavity 123 and improve the stability of hanging in the air and fetching. Of course, in its implementation example, shaft holes can also be formed in two ends of the top connecting body 12, and the two ends of the handle portion 13 can be placed inside the shaft holes. Or, the handle portion 13 can be integrally formed with the top connecting body 12 to achieve the mounting of the handle portion 13.

In the above embodiment, referring to FIG. 9, a circuit board 7 respectively electrically connected to the fan 8 and the lamp panel 75 is arranged in the mounting cavity 411. Turning on and turning off of the fan 8 and the lamp panel 75 can be controlled through the circuit board 7. The mounting cavity 411 is provided with a USB interface 71 that is electrically connected to the circuit board 7 and configured to transmit data. The USB interface 71 can be used to update a circuit program on the circuit board 7 or load music or a light control program to the circuit board 7, so as to control a light change effect of the atmosphere lamp 76.

The surface shell 41 is provided with a wiring hole (not shown in the figure) on one side of the insertion surrounding wall 416 close to the middle frame 2. A lead wire for electrically connecting the lamp panel 75 to the circuit board 7 passes through the wiring hole and is distributed along a side wall of the middle frame 2.

In an embodiment, a speaker 73 electrically connected to the circuit board 7 is further arranged inside the mounting cavity 411, and a sound outlet hole 421 is formed in a position, corresponding to the speaker 73, at the bottom of the base 4. Music can be played through the speaker 73, which improves the atmosphere set-off effect and enhances the utility function of the scene simulation device of this embodiment.

In an embodiment, a wireless module (not shown in the figure) connected to external equipment is arranged on the circuit board 7. Specifically, the wireless module can be a Bluetooth module, a 4*g* module, a 3*g* module, a 2*g* module, and the like, so that an external terminal can be connected to the scene simulation device of this embodiment for use, so as to change the played music or separately control start and stop of the fan 8 and the music. This facilitates use. Specifically, the external terminal can be a mobile phone, a computer, and the like.

In an embodiment, the bottom plate 42 is provided with a power button 74 electrically connected to the circuit board 7. Through the power button 74, start and stop of the scene simulation device of this embodiment, and start and stop of the fan 8 and music can be controlled. This facilitates use.

In an embodiment, a battery electrically connected to the circuit board 7 is arranged in the mounting cavity 411. The battery supplies power to the circuit board 7, which avoids wiring and facilitates use.

In an embodiment, a bottom surface of the bottom plate 42 is sunken to form two battery compartments 423 in a direction towards the mounting cavity 411; and the two battery compartments 423 are located on two sides of the bottom pipeline, so as to effectively use the space and reduce the volume of the base. Specifically, there are a plurality of batteries respectively arranged in the battery compartments 423.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of “first”, “second”, etc. in the present disclosure are only used for descriptive purposes, and cannot be understood as indicating or implying its relative importance or implicitly indicating the number of technical features indicated. Therefore, features defined by “first” and “second” can explicitly instruct or impliedly include at least one feature. In addition, “and/or” in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A scene simulation device, comprising: a shell having a scene space, and floating flocs, a transport pipeline, and a fan which are arranged in the shell, wherein the shell comprises a middle frame, and a top shell and a base which are respectively connected to an upper end and a lower end of the middle frame; the scene space is formed by enclosing the middle frame, the top shell, and the base;

a bottom opening of the transport pipeline is communicated to the scene space and is located at a bottom of the scene space: a position of a top opening of the transport pipeline is equal to or greater than ⅔ of a height of the middle frame; and a distance between the top opening of the transport pipeline and a dispersing component is equal to or less than ⅓ of a distance between the dispersing component and a bottom surface of the scene space: the floating flocs are configured to enter the transport pipeline along the bottom of the scene space and are sprayed out from a top of the transport pipeline along the transport pipeline when the fan is turned on; and the dispersing component configured to disperse the floating flocs sprayed out from the transport pipeline is arranged in the scene space; and wherein a plurality of display windows are formed in a side wall of the middle frame; a first transparent plate is arranged at the display windows; and a first gap communicated to the scene space is formed between the first transparent plate and an inner side wall of the middle frame.

2. The scene simulation device according to claim 1, wherein the dispersing component is located right above the top opening of the transport pipeline; at least a portion of an outer surface of the dispersing component is one of a spherical surface, a quasi spherical surface, an arc-shaped surface, a quasi arc-shaped surface, or an inclined surface; and the quasi spherical surface and the quasi arc-shaped surface are each composed of at least one arc-shaped surface and/or at least one plane.

3. The scene simulation device according to claim 1, wherein a material of the transport pipeline is plastic.

4. The scene simulation device according to claim 1, wherein the transport pipeline is located between two adjacent display windows.

5. The scene simulation device according to claim 1, wherein an atmosphere lamp is arranged on the top shell.

6. The scene simulation device according to claim 1, wherein a supporting seat and scene decorations arranged on the supporting seat are arranged in the scene space, and a bottom surface of the supporting seat is spaced apart from the bottom surface of the scene space.

7. The scene simulation device according to claim 6, wherein the bottom surface of the scene space is connected to the supporting seat through a plurality of supporting columns spaced apart from each other.

8. A scene simulation device, comprising: a shell having a scene space, and floating flocs, a transport pipeline, and a fan which are arranged in the shell, wherein the shell comprises a middle frame, and a top shell and a base which are respectively connected to an upper end and a lower end of the middle frame; the scene space is formed by enclosing the middle frame, the top shell, and the base;

a bottom opening of the transport pipeline is communicated to the scene space and is located at a bottom of the scene space; a position of a top opening of the transport pipeline is equal to or greater than ⅔ of a height of the middle frame; and a distance between the top opening of the transport pipeline and a dispersing component is equal to or less than ⅓ of a distance between the dispersing component and a bottom surface of the scene space; the floating flocs are configured to enter the transport pipeline along the bottom of the scene space and are sprayed out from a top of the transport pipeline along the transport pipeline when the fan is turned on; and the dispersing component configured to disperse the floating flocs sprayed out from the transport pipeline is arranged in the scene space; and wherein a top of the middle frame extends outwards to form an outer rim: an air inlet hole communicated to the scene space is formed in the outer rim; and the outer rim is connected to the top shell.

9. A scene simulation device, comprising: a shell having a scene space, and floating flocs, a transport pipeline, and a fan which are arranged in the shell, wherein the shell comprises a middle frame, and a top shell and a base which are respectively connected to an upper end and a lower end of the middle frame; the scene space is formed by enclosing the middle frame, the top shell, and the base;

a bottom opening of the transport pipeline is communicated to the scene space and is located at a bottom of the scene space; a position of a top opening of the transport pipeline is equal to or greater than ⅔ of a height of the middle frame; and a distance between the top opening of the transport pipeline and a dispersing component is equal to or less than ⅓ of a distance between the dispersing component and a bottom surface of the scene space; the floating flocs are configured to enter the transport pipeline along the bottom of the scene space and are sprayed out from a top of the transport pipeline along the transport pipeline when the fan is turned on; and the dispersing component configured to disperse the floating flocs sprayed out from the transport pipeline is arranged in the scene space; and wherein the top shell comprises an outer cover and a second transparent plate arranged on an inner side of the outer cover; a plurality of decorative holes are formed in a position, corresponding to the second transparent plate, on the outer cover; and a second gap communicated to the scene space is formed between the second transparent plate and an inner side wall of the outer cover.

10. The scene simulation device according to claim 9, wherein the dispersing component and the second transparent plate or outer cover is integrally formed.

11. The scene simulation device according to claim 9, wherein the transport pipeline comprises a bottom pipeline communicated to the scene space and a vertical pipeline that is connected to the bottom pipeline and arranged on a side wall of the middle frame: one end of the bottom pipeline away from the vertical pipeline is connected to an air outlet of the fan; and the fan and the bottom pipeline are both located in the base.

12. The scene simulation device according to claim 11, wherein the base comprises a surface shell and a bottom plate connected to the surface shell to form a mounting cavity: the fan and the bottom pipeline are both located in the mounting cavity:

the surface shell is provided with a first through hole communicated to the bottom pipeline and a second through hole communicated to the bottom pipeline and the vertical pipeline respectively; and the fan is located on one side of the first through hole away from the vertical pipeline.

13. The scene simulation device according to claim 12, wherein the bottom pipeline comprises: two pipeline side walls molded with the surface shell in an integrated molding manner and a panel connected to the pipeline side walls: the surface shell protrudes upwards along a circumferential side of the second through hole to form an insertion surrounding wall: a bottom of the vertical pipeline is arranged inside the insertion surrounding wall.

14. The scene simulation device according to claim 13, wherein a circuit board connected to the fan and the atmosphere lamp respectively are arranged in the mounting cavity; and the bottom plate is provided with a USB interface connected to the circuit board and configured to transmit data.

15. The scene simulation device according to claim 14, wherein a speaker electrically connected to the circuit board is further arranged inside the mounting cavity, and a sound outlet hole is formed in a position, corresponding to the speaker, at the bottom of the bottom plate.

16. The scene simulation device according to claim 15, wherein a wireless module connected to external equipment is arranged on the circuit board.

17. The scene simulation device according to claim 11, wherein a width of a cross section of the supporting seat gradually decreases from bottom to top; a circumferential side of the supporting seat is spaced apart from the side wall of the scene space; and a width of a cross section of the bottom surface of the scene space gradually decreases from top to bottom.

18. The scene simulation device according to claim 17, wherein a battery electrically connected to the circuit board is arranged in the mounting cavity.

19. The scene simulation device according to claim 18, wherein a bottom surface of the bottom plate is sunken to form two battery compartments in a direction towards the mounting cavity; the two battery compartments are located on two sides of the bottom pipeline; and there are a plurality of batteries respectively arranged in the battery compartments.

* * * * *